J. A. HAMMON.
Whiffletree Hook.
No. 91,230.
Patented June 15, 1869.
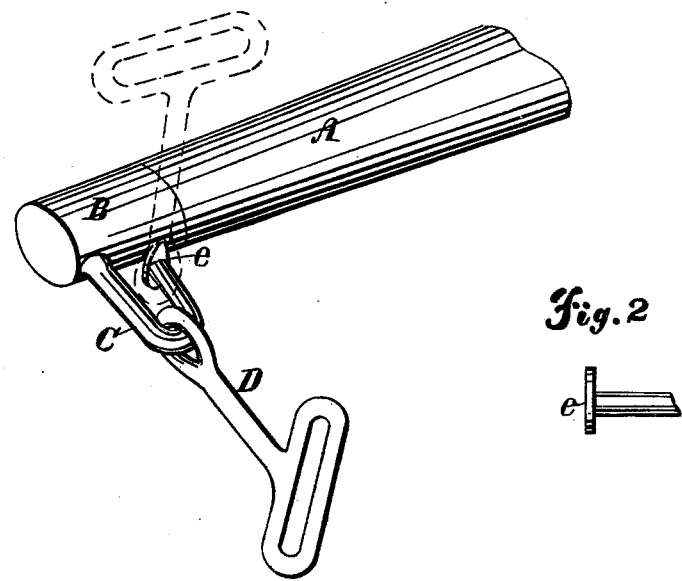
Witnesses,
L. Hailer
P. T. Dodge
Inventor, John A. Hammon
by Dodge & Munn
his attys.

United States Patent Office.

JOHN A. HAMMON, OF FRANCONIA, MINNESOTA.

Letters Patent No. 91,230, dated June 15, 1869.

IMPROVEMENT IN WHIFFLETREE-HOOK.

The Schedule referred to in these Letters Patent and making part of the same.

*To all whom it may concern:*

Be it known that I, JOHN A. HAMMON, of Franconia, in the county of Chisago, and State of Minnesota, have invented certain new and useful Improvements in Whiffletree-Hooks; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to hooks for whiffletrees; and

It consists in constructing the hook in a peculiar manner, to prevent the tug or trace from becoming accidentally unhooked, as hereinafter more fully explained.

Figure 1 is a perspective view of my improved hook as applied to a whiffletree, and Figure 2 is a side view of a portion of the same.

A great variety of devices has been made, from time to time, for the purpose of securely fastening the tugs or traces of horses to their whiffletrees; but most of these devices have been constructed with springs or hinged joints, thereby rendering them more complicated and expensive to make; and many of them, when made, either do not effectually prevent the tug from becoming detached when slackened, as in going down hill, or are difficult to release when necessary.

The object of my invention is to obviate these objections, and, at the same time, produce a simple, cheap, yet strong and efficient device for the purpose intended, and that can be made by ordinary blacksmiths.

In the accompanying drawings—

A represents the end of an ordinary whiffletree, upon which is secured the hook C, by its socket or ferrule B, as shown in fig. 1, though, if preferred, the ferrule B may be dispensed with, and the hook be secured in any other manner, as is often done with other styles of hooks.

The hook C is formed as represented in the drawings, and is simply a plain bent piece of metal, its inner part being turned directly backward, in a straight line, toward the front side of the whiffletree, parallel with its outer part, but, of course, stopping short of reaching the whiffletree, there being left sufficient space between its end and the whiffletree to permit the eye D, which is to be attached to the tug or trace, to be slipped over its end.

Upon the end of the hook C, I form a small lozenge-shaped knob or cross-piece, e, which stands vertical, as represented in fig. 2, this knob or guard being made of such a size as to permit the eye D to pass over it, when the eye is turned up, as represented in red in fig. 1.

This knob e is forged solid with the hook, and, consequently, will always retain its position in relation to the hook; and, when the eye D is slipped over it, there is no danger of its becoming detached accidentally, while, at the same time, it is only necessary to turn up the eye, to unhook it.

By this means, I am able to construct an extremely simple, cheap, and efficient device.

Having thus described my invention,

What I claim, is—

The whiffletree-hook C, provided with the vertical, lozenge-shaped knob or guard e, substantially as shown and described.

J. A. HAMMON.

Witnesses:
   J. S. GROVE,
   CHARLES VITALIS.